United States Patent
Kwak et al.

(10) Patent No.: US 12,016,519 B2
(45) Date of Patent: Jun. 25, 2024

(54) ROBOT CLEANER AND METHOD FOR CONTROLLING SAME

(71) Applicant: LG ELECTRONICS INC., Seoul (KR)

(72) Inventors: Donghoon Kwak, Seoul (KR); Jaehwan Ko, Seoul (KR); Hyukdo Kweon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 720 days.

(21) Appl. No.: 17/261,519

(22) PCT Filed: Jul. 22, 2019

(86) PCT No.: PCT/KR2019/009017
§ 371 (c)(1),
(2) Date: Jan. 19, 2021

(87) PCT Pub. No.: WO2020/017942
PCT Pub. Date: Jan. 23, 2020

(65) Prior Publication Data
US 2021/0338031 A1    Nov. 4, 2021

(30) Foreign Application Priority Data
Jul. 20, 2018   (KR) .......................... 10-2018-0084979

(51) Int. Cl.
*A47L 9/28* (2006.01)
*A47L 11/40* (2006.01)
(Continued)

(52) U.S. Cl.
CPC .......... *A47L 9/2894* (2013.01); *A47L 9/2852* (2013.01); *A47L 11/4011* (2013.01);
(Continued)

(58) Field of Classification Search
None
See application file for complete search history.

(56) References Cited

U.S. PATENT DOCUMENTS 9,717,387 B1 * 8/2017 Szatmary ............. A47L 9/2805
2013/0060379 A1   3/2013 Choe et al.
(Continued)

FOREIGN PATENT DOCUMENTS

| JP | 2005-349497 | 12/2005 |
| JP | 2013-085606 | 5/2013 |

(Continued)

OTHER PUBLICATIONS

PCT International Search Report of PCT/KR2019/009017 dated Nov. 19, 2019.
Notice of Allowance of KR 10-2018-0084979 dated Mar. 31, 2020.

*Primary Examiner* — Tamara L Weber
(74) *Attorney, Agent, or Firm* — Birch, Stewart, Kolasch & Birch, LLP

(57) ABSTRACT

Disclosed are a robot cleaner and a method for controlling same. The robot cleaner comprises: a travel unit for moving a main body; a communication unit for communicating with a remote control device by using ultra-wideband signals; and a control unit which, in response to a first optical signal emitted from the remote control device to the main body, calculates the position of the remote control device by using the ultra-wideband signals that are output to the communication unit. Also, the control unit recognizes, in response to a second optical signal emitted from the remote control device directly after the first optical signal, the position of a target point corresponding to the second optical signal and calculated on the basis of the determined position of the remote control device, and generates a travel command to move the main body to the recognized position of the target point.

9 Claims, 13 Drawing Sheets

(51) Int. Cl.
  *B25J 9/16*    (2006.01)
  *B25J 11/00*   (2006.01)
  *G08C 17/00*   (2006.01)
  *G08C 23/00*   (2006.01)

(52) U.S. Cl.
  CPC ......... *B25J 9/1666* (2013.01); *B25J 11/0085* (2013.01); *A47L 2201/04* (2013.01); *G08C 17/00* (2013.01); *G08C 23/00* (2013.01)

(56) References Cited

U.S. PATENT DOCUMENTS

| | | | |
|---|---|---|---|
| 2014/0074287 A1* | 3/2014 | LaFary | ................. B25J 9/1676 700/253 |
| 2016/0274579 A1* | 9/2016 | So | ........................ A47L 9/2857 |
| 2017/0000307 A1 | 1/2017 | Choi et al. | |
| 2017/0020356 A1 | 1/2017 | Zhang et al. | |

FOREIGN PATENT DOCUMENTS

| | | |
|---|---|---|
| KR | 10-2009-0076721 | 7/2009 |
| KR | 10-2014-0066850 | 6/2014 |
| KR | 10-2015-0047893 | 5/2015 |
| KR | 10-2016-0056559 | 5/2016 |
| KR | 10-2016-0126968 | 11/2016 |
| KR | 10-2016-0144682 | 12/2016 |

* cited by examiner

FIG. 11
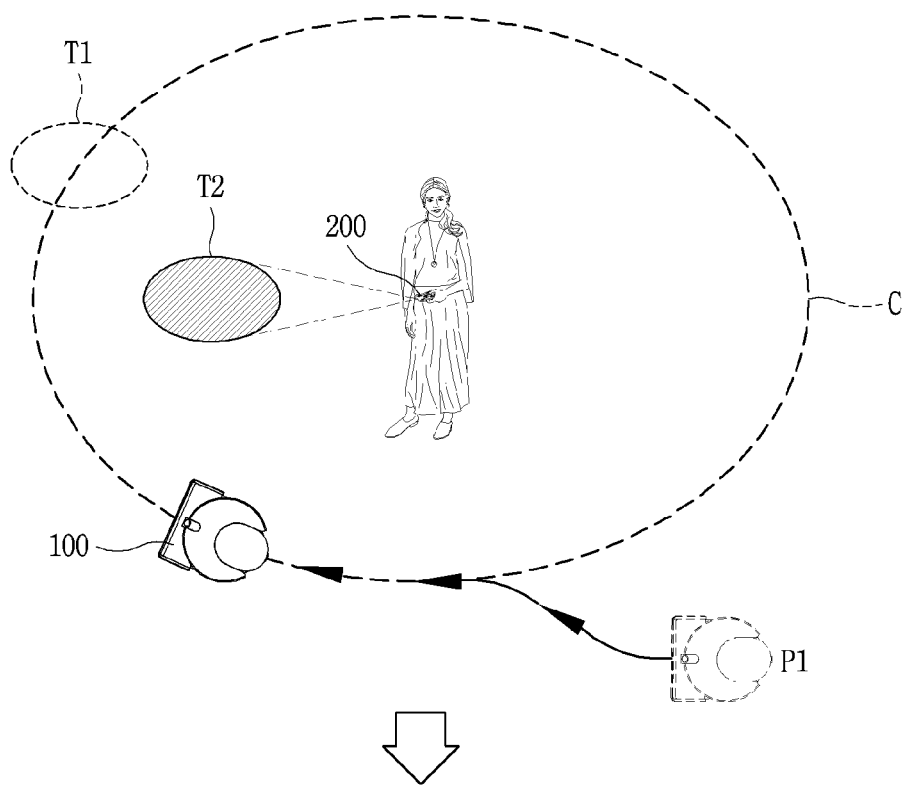
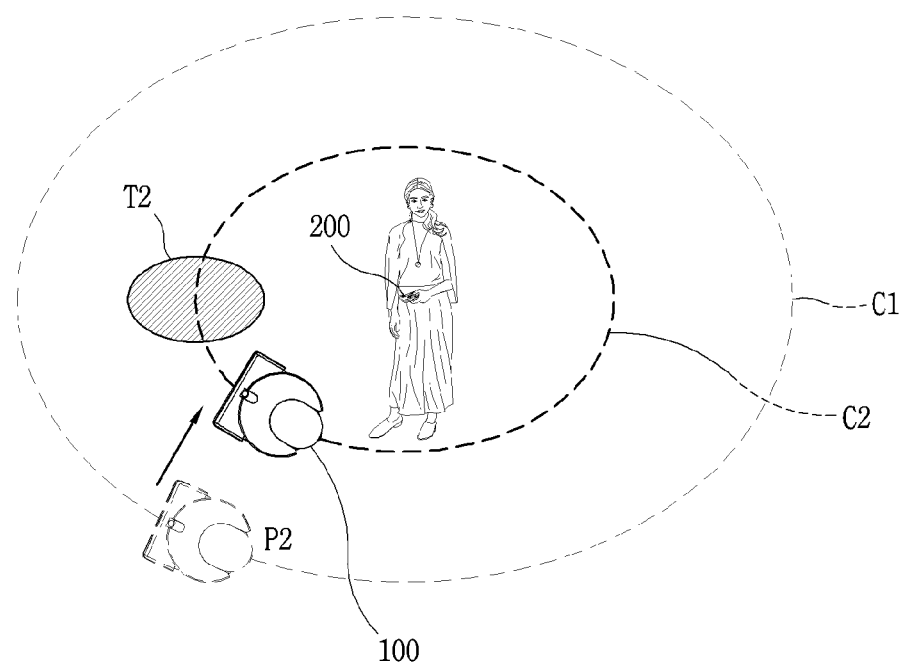

ROBOT CLEANER AND METHOD FOR CONTROLLING SAME

CROSS-REFERENCES TO RELATED APPLICATIONS

This application is the National Stage filing under 35 U.S.C. 371 of International Application No. PCT/KR2019/009017, filed on Jul. 22, 2019, which claims the benefit of earlier filing date and right of priority to Korean Application No. 10-2018-0084979 filed on Jul. 20, 2018, the contents of which are all hereby incorporated by reference herein in their entirety.

BACKGROUND

Technical Field

The present disclosure relates to a robot cleaner capable of performing communication with a remote control device,

Background Art

A cleaner is a device that performs cleaning by sucking or mopping dust or foreign materials. Generally, the cleaner performs a cleaning function for a floor, and includes wheels for movement. Generally, the wheels are rolled by external force applied to a main body of the cleaner to move the main body relative to the floor.

In recent years, however, studies have been actively conducted on robot cleaners, such as a robot cleaner that performs cleaning while traveling by itself without a users manipulation, a cleaner that moves by itself along a nozzle moved by a users manipulation, and the like.

Meanwhile, a robot cleaner may move using a predefined pattern, move while avoiding an external obstacle detected by a sensor, or move based on an infrared signal transmitted from a remote control device operated by a user.

When the robot cleaner exists at a distance far from the user. there is a disadvantage that an infrared signal does not reach up to the cleaner even if it is emitted using the remote control device. In addition, even when an obstacle exists between the robot cleaner and the remote control device, there is a problem in that a signal is blocked or does not sufficiently reach the robot cleaner due to the obstacle.

In this case, in order to move the robot cleaner to a specific position using the remote control device in the related art, the user should inconveniently move to a position where the robot cleaner is located and emit a signal through the remote control device or should move the robot cleaner to a designated position such that the robot cleaner moves to a desired position from the designated position.

SUMMARY

Technical Problem

Therefore, one aspect of the present disclosure is to provide a robot cleaner capable of performing pointing cleaning for an area/point far from the robot cleaner, without a user's operation to call the robot cleaner or perform drag travel after moving close to the robot cleaner, even when the user operating a remote control device is located far from the robot cleaner or an obstacle is present between the user and the robot cleaner, and a method for controlling the same.

Technical Solution

A robot cleaner according to one implementation of the present disclosure may include a traveling unit to move a main body thereof, a communication unit to perform communication with a remote control device using an ultra-wideband (UWB) signal, and a control unit to calculate a position of the remote control device using the UWB signal output to the communication unit, in response to a first optical signal emitted from the remote control device to the main body. The control unit may recognize a position of a target point corresponding to a second optical signal emitted from the remote control device, calculated based on the position of the remote control device, in response to the second optical signal emitted directly after the first optical signal, and generate a travel command for controlling the main body to move to the recognized position of the target point.

In one implementation, the communication unit may include a UWB module to transmit or receive the UWB signal, and may determine a relative position of the remote control device by transmitting a UWB signal to the remote control device through the UWB module in response to the first optical signal and receiving a corresponding UWB signal through another UWB module provided in the remote control device.

In one implementation, the control unit may acquire first coordinate information corresponding to the relative position of the remote control device with respect to the main body based on the UWB signal received through the communication unit, transmit the acquired first coordinate information to the remote control device such that the remote control device calculates second coordinate information corresponding to the position of the target point based on the first coordinate information, receive third coordinate information calculated based on the second coordinate information and the main body from the remote control device, and control the main body to move to a position corresponding to the third coordinate information.

In one implementation, the control unit may acquire first coordinate information corresponding to the relative position of the remote control device with respect to the main body based on the UWB signal received through the communication unit, receive second coordinate information corresponding to a relative position of the target point, to the remote control device, the relative position of the target point being calculated with respect to the remote control device, and estimate a relative position of the target point with respect to the main body based on the first coordinate information and the second coordinate information.

In one implementation, in response to a second optical signal and a third optical signal continuously emitted from the remote control device to different points directly after the first optical signal, the control unit may acquire a position of a second target point corresponding to the third optical signal additionally calculated based on the calculated position of the remote control device, and acquire a relative position of the second target point with respect to the position of the target point corresponding to the second optical signal.

In one implementation, the control unit may generate a first travel command for moving the main body to the position of the target point corresponding to the second optical signal, and generate a second travel command for moving the main body to the relative position of the second target point when a task at the target point corresponding to the second optical signal is completed.

A robot cleaner according to another implementation of the present disclosure may include a traveling unit to move a main body thereof, a communication unit to perform communication with a remote control device using an ultra-wideband (UWB) signal, and a control unit to calculate a position of the remote control device using the UWB signal output from the communication unit. The control unit may generate a virtual trajectory centered on the position of the remote control device when an optical signal pointing to a target point is emitted from the remote control device, and generate a second travel command for following a path of the virtual trajectory until arriving at the target point, at which the optical signal is received from the remote control device, when the main body enters the virtual trajectory according to the first travel command.

In one implementation, the virtual trajectory may have a radius corresponding to a distance from the calculated position of the remote control device to the target point corresponding to the optical signal. The control unit may determine a direction of entering the virtual trajectory so that the main body follows the path of the virtual trajectory in a predetermined direction.

In one implementation, the main body may include a plurality of receivers to receive an optical signal emitted from the remote control device. When the main body arrives near a point where the optical signal is received within the virtual trajectory according to the second travel command, the control unit may recognize the position of the target point based on signal strength of the optical signal received by the plurality of receivers, and control the traveling unit to move to the recognized position of the target point.

In one implementation, the control unit may control the traveling unit to, follow the virtual trajectory along around an obstacle when the obstacle is detected in the virtual trajectory while traveling along the path of the virtual trajectory.

In one implementation, when the second optical signal corresponding to a changed target point is generated from the remote control device while the main body travels along the path of the virtual trajectory, the control unit may generate a second virtual trajectory having a radius corresponding to a distance from the remote control device to the changed target point corresponding to the second optical signal, and control the traveling unit so that the main body enters the second virtual trajectory from a current position according to the second travel command.

Advantageous Effects

In the robot cleaner and the control method thereof according to the implementations of the present disclosure, even when the user manipulating the remote control device is far apart from the robot cleaner or an obstacle exists between the user and the robot cleaner, pointing cleaning for an area/point far apart from the robot cleaner can be performed.

In addition, even if the remote control device does not point to the robot cleaner at the beginning, the robot cleaner can arrive at an area/point pointed by the remote control device by following a path of a virtual trajectory centered on the position of the remote control device. Furthermore, a plurality of areas/points at remote distances can be pointed at once by the remote control device. Even in this case, pointing cleaning can be sequentially performed for the plurality of designated areas/points without having to go through an initial position or a designated position.

BRIEF DESCRIPTION OF THE DRAWINGS

FIG. 11 is an exemplary conceptual view illustrating a method of changing the target point in the first implementation, in the robot cleaner according to the one implementation of the present disclosure.

DETAILED DESCRIPTION

Hereinafter, a robot cleaner according to the present disclosure will be described in detail with reference to the accompanying drawings.

Hereinafter, description will be given in detail of implementations disclosed herein. Technical terms used in this specification are merely used for explaining specific implementations, and should not be construed to limit the scope of the technology disclosed herein.

Figure 1:
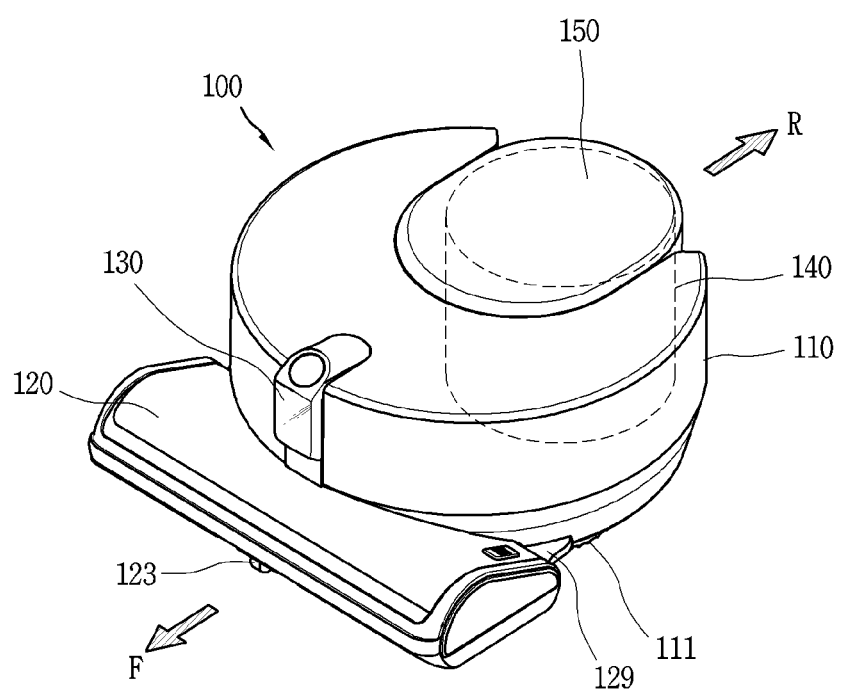
FIG. 1 is a perspective view illustrating one implementation of a robot cleaner according to the present disclosure.
Figure 2:
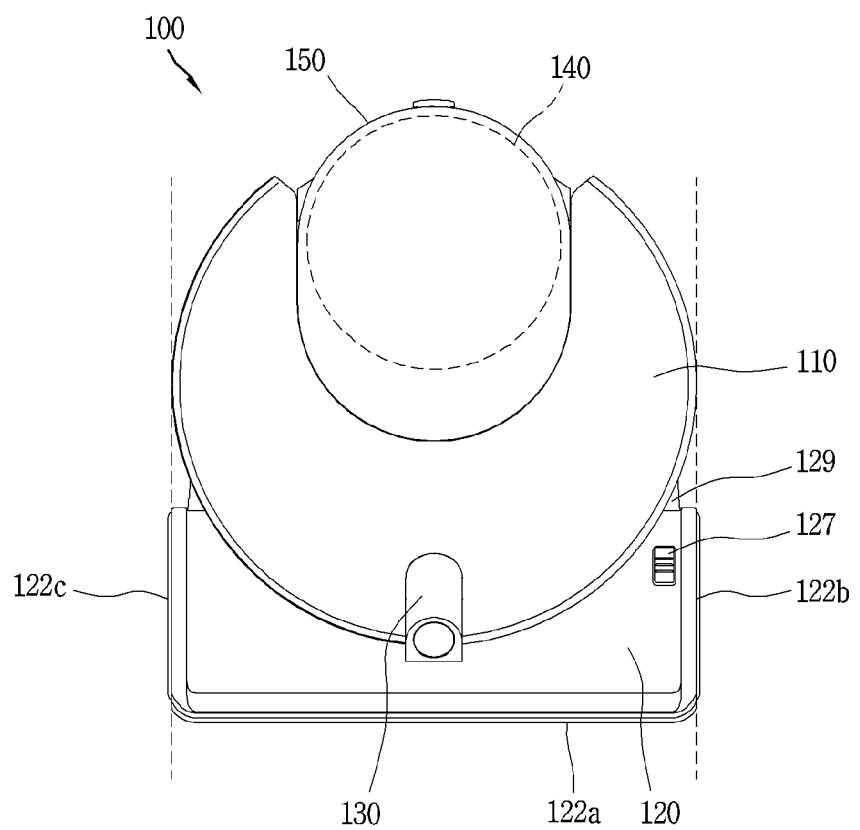
FIG. 2 is a planar view of the robot cleaner illustrated in FIG. 1.
Figure 3:
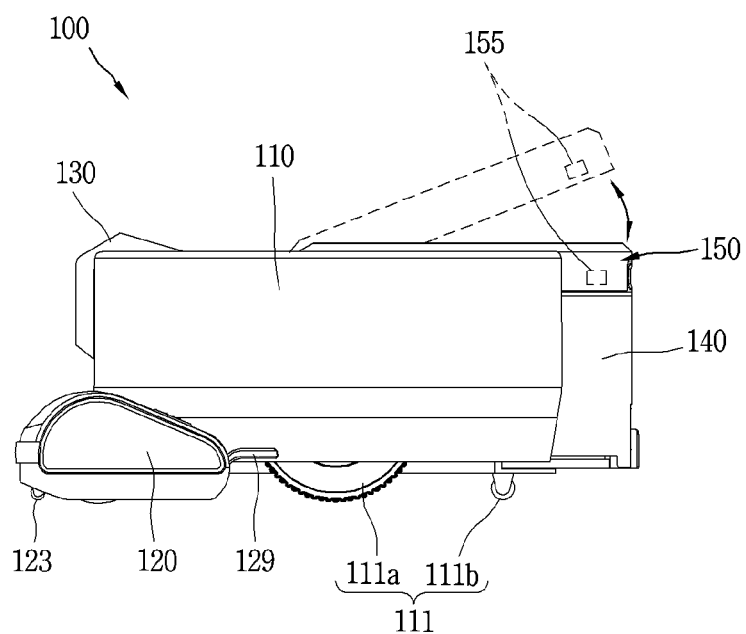
FIG. 3 is a lateral view of the robot cleaner illustrated in FIG. 1.

FIG. 1 is a perspective view illustrating one implementation of a robot cleaner 100 according to the present disclosure, FIG. 2 is a planar view of the robot cleaner 100 illustrated in FIG. 1, and FIG. 3 is a lateral view of the robot cleaner 100 illustrated in FIG. 1.

In this disclosure, a moving robot, a robot cleaner, and an autonomous cleaner that performs autonomous travel may be used in the same sense. In this specification, a plurality of robot cleaners may include at least part of configurations illustrated in FIGS. 1 to 3.

Referring to FIGS. 1 to 3, a robot cleaner 100 performs a function of cleaning a floor while traveling on a predetermined area by itself. Cleaning the floor disclosed herein includes sucking dust (including foreign materials) on the floor or mopping the floor.

The robot cleaner 100 may include a cleaner main body 110, a cleaning unit 120, a sensing unit 130, and a dust bin 140.

The cleaner main body 110 is provided with various components in addition to a controller (not illustrated) for controlling the robot cleaner 100. In addition, the cleaner main body 110 is provided with a wheel unit 111 for traveling the robot cleaner 100. The robot cleaner 100 may be moved or rotated forward, backward, left or right by the wheel unit 111.

Referring to FIG. 3, the wheel unit 111 includes main wheels 111a and a sub wheel 111b.

The main wheels 111a are provided on both sides of the cleaner main body 110 and configured to be rotatable in one direction or another direction according to a control signal of the control unit. Each of the main wheels 111a may be configured to be driven independently of each other. For example, each main wheel 111a may be driven by a different motor. Or each main wheel 111a may be driven by a plurality of different axes provided in one motor.

The sub wheel 111b supports the cleaner main body 110 together with the main wheels 111a and assists the traveling of the robot cleaner 100 by the main wheels 111a. The sub wheel 111b may also be provided on a cleaning unit 120 to be described later.

The control unit controls the driving of the wheel unit 111, so that the robot cleaner 100 is allowed to autonomously run the floor.

Meanwhile. the cleaner main body 110 is provided with a battery (not shown) for supplying power to the robot cleaner 100. The battery 190 may be configured to be rechargeable, and may be detachably disposed in a bottom portion of the cleaner main body 110.

In FIG. 1, a cleaning unit 120 may be disposed in a protruding form from one side of the cleaner main body 110, so as to suck air containing dust or mop an area. The one side may be a side where the cleaner main body 110 travels in a forward direction F, that is, a front side of the cleaner main body 110.

In this drawing, the cleaning unit 120 is shown having a shape protruding from one side of the cleaner main body 110 to front and both left and right sides. Specifically, a front end portion of the cleaning unit 120 is disposed at a position spaced forward apart from the one side of the cleaner main body 110, and left and right end portions of the cleaning unit 120 are disposed at positions spaced apart from the one side of the cleaner main body 110 in the right and left directions.

As the cleaner main body 110 is formed in a circular shape and both sides of a rear end portion of the cleaning unit 120 protrude from the cleaner main body 110 to both left and right sides, empty spaces, namely, gaps may be formed between the cleaner main body 110 and the cleaning unit 120. The empty spaces are spaces between both left and right end portions of the cleaner main body 110 and both left and right end portions of the cleaning unit 120 and each has a shape recessed into the robot cleaner 100.

If an obstacle is caught in the empty space, the robot cleaner 100 may be likely to be unmovable due to the obstacle. To prevent this, a cover member 129 may be disposed to cover at least part of the empty space.

The cover member 129 may be provided on the cleaner main body 110 or the cleaning unit 120. In an implementation of the present disclosure, the cover member 129 protrude from each of both sides of the rear end portion of the cleaning unit 120 and covers an outer circumferential surface of the cleaner main body 110.

The cover member 129 is disposed to fill at least part of the empty space, that is, the empty space between the cleaner main body 110 and the cleaning unit 120. This may result in realizing a structure capable of preventing an obstacle from being caught in the empty space, or to easily escape an obstacle even if the obstacle is caught in the empty space.

The cover member 129 protruding from the cleaning unit 120 may be supported on the outer circumferential surface of the cleaner main body 110.

The cover member 129 may be supported on a rear portion of the cleaning unit 120 if the cover member 129 protrudes from the cleaner main body 110. According to this structure, when the cleaning unit 120 is impacted due to colliding with an obstacle, a part of the impact is transferred to the cleaner main body 110 so as to be dispersed.

The cleaning unit 120 may be detachably coupled to the cleaner main body 110. When the cleaning unit 120 is detached from the cleaner main body 110, a mop module (not shown) may be detachably coupled to the cleaner main body 110 in place of the detached cleaning unit 120.

Accordingly, the user can mount the cleaning unit 120 on the cleaner main body 110 when the user wishes to remove dust on the floor, and may mount the mop module on the cleaner main body 110 when the user wants to mop the floor.

When the cleaning unit 120 is mounted on the cleaner main body 110, the mounting may be guided by the cover member 129 described above. That is, as the cover member 129 is disposed to cover the outer circumferential surface of the cleaner main body 110, a relative position of the cleaning unit 120 with respect to the cleaner main body 110 may be determined.

The cleaning unit 120 may be provided with a castor 123. The caster 123 assists the running of the robot cleaner 100 and also supports the robot cleaner 100.

The cleaner main body 110 is provided with a sensing unit 130. As illustrated, the sensing unit 130 may be disposed on one side of the cleaner main body 110 where the cleaning unit 120 is located, that is, on a front side of the cleaner main body 110.

The sensing unit 130 may be disposed to overlap the cleaning unit 120 in an up and down direction of the cleaner main body 110. The sensing unit 130 is disposed at an upper portion of the cleaning unit 120 so as to detect an obstacle or feature in front of the robot so that the cleaning unit 120 positioned at the forefront of the robot cleaner 100 does not hit the obstacle.

The sensing unit 130 may be configured to additionally perform another sensing function other than the sensing function.

By way of example, the sensing unit 130 may include a camera 131 for acquiring surrounding images. The camera 131 may include a lens and an image sensor. The camera 131 may convert a surrounding image of the cleaner main body 110 into an electrical signal that can be processed by the control unit. For example, the camera 131 may transmit an electrical signal corresponding to an upward image to the control unit. The electrical signal corresponding to the upward image may be used by the control unit to detect the position of the cleaner main body 110.

In addition, the sensing unit 130 may detect obstacles such as walls, furniture, and cliffs on a traveling surface or a traveling path of the robot cleaner 100. Also, the sensing unit 130 may sense presence of a docking device that performs battery charging. Also, the sensing unit 130 may detect ceiling information so as to map a traveling area or a cleaning area of the robot cleaner 100.

The cleaner main body 110 is provided with a dust container 140 detachably coupled thereto for separating and collecting dust from sucked air.

The dust container 140 is provided with a dust container cover 150 which covers the dust container 140. In an implementation, the dust container cover 150 may be coupled to the cleaner main body 110 by a hinge to be rotatable. The dust container cover 150 may be fixed to the dust container 140 or the cleaner main body 110 to keep covering an upper surface of the dust container 140. The dust container 140 may be prevented from being separated from the cleaner main body 110 by the dust container cover 150 when the dust container cover 150 is disposed to cover the upper surface of the dust container 140.

A part of the dust container 140 may be accommodated in a dust container accommodating portion and another part of the dust container 140 protrudes toward the rear of the cleaner main body 110 (i.e., a reverse direction R opposite to a forward direction F).

The dust container 140 is provided with an inlet through which air containing dust is introduced and an outlet through which air separated from dust is discharged. The inlet and the outlet communicate with each other through an opening 155 formed through an inner wall of the cleaner main body 110 when the dust container 140 is mounted on the cleaner main body 110. Thus, an intake passage and an exhaust passage inside the cleaner main body 110 may be formed.

According to such connection, air containing dust introduced through the cleaning unit 120 flows into the dust container 140 through the intake passage inside the cleaner main body 110 and the air is separated from the dust while passing through a filter and cyclone of the dust container 140. Dust is collected in the dust container 140, and air is discharged from the dust container 140 and then discharged to the outside through the discharge port 112 in the cleaner body 110 and finally through the discharge port 112.

Hereinafter, an implementation related to the components of the robot cleaner 100 will be described with reference to FIG. 4.

A robot cleaner 100 or a moving robot according to an implementation of the present disclosure may include a communication unit 1100, an input unit 1200, a travel unit 1300, a sensing unit 1400, an output unit 1500, a power supply unit 1600, a memory 1700, a control unit 1800, and a cleaning unit 1900, or a combination thereof.

Figure 4:
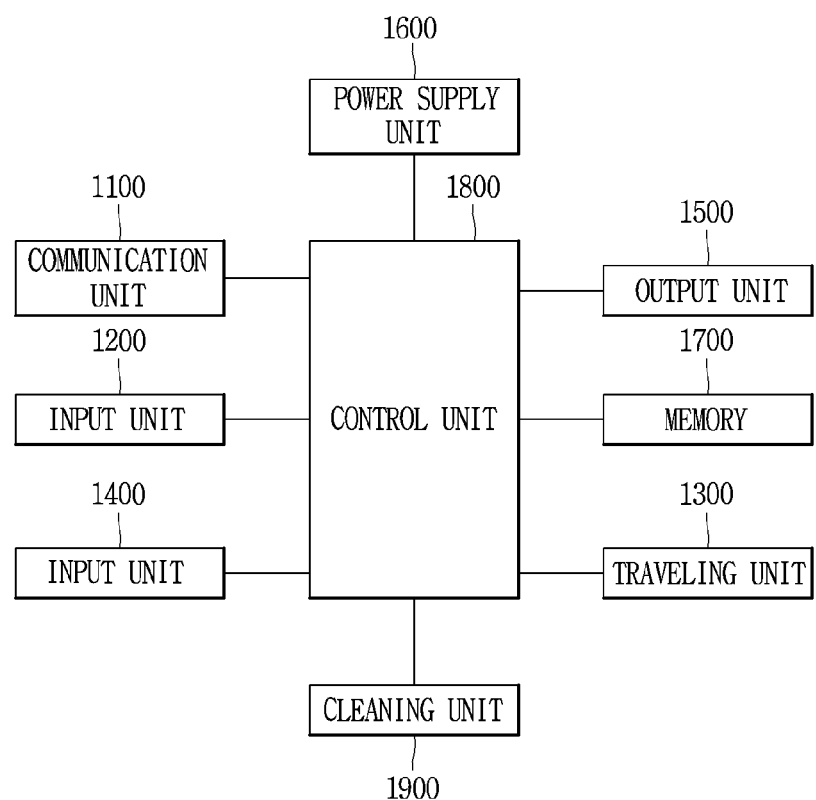
FIG. 4 is a block diagram illustrating exemplary components of a robot cleaner according to one implementation of the present disclosure.

At this time, those components shown in FIG. 4 are not essential, and a robot cleaner having greater or fewer components can be implemented. Also, as described above, each of a plurality of robot cleaners described in the present disclosure may equally include only some of components to be described below. That is, a plurality of robot cleaners may include different components.

Hereinafter, each component will be described.

First, the power supply unit 1600 includes a battery that can be charged by an external commercial power supply, and supplies power to the moving robot. The power supply unit 1600 supplies driving power to each of the components included in the moving robot to supply operating power required for the moving robot to travel or perform a specific function.

Here, the control unit 1800 may sense the remaining power of the battery, and control the battery to move power to a charging base connected to the external commercial power source when the remaining power is insufficient, and thus a charge current may be supplied from the charging base to charge the battery. The battery may be connected to a battery sensing portion so that a remaining power level and a charging state can be transmitted to the control unit 1800. The output unit 1500 may display the remaining battery level under the control of the control unit.

The battery may be located in a bottom portion of a center of the robot cleaner, or may be located in either the left or right side. In the latter case, the mobile robot may further include a balance weight to eliminate weight bias of the battery.

The control unit 1800 performs processing of information based on an artificial intelligence (AI) technology and may include one or more modules that perform at least one of learning of information, inference of information, perception of information, and processing of natural language.

The control unit 1800 may use a machine running technology to perform at least one of learning, inferring and processing a large amount of information (big data), such as information stored in the cleaner, environmental information around a mobile terminal, information stored in an external storage capable of performing communication, and the like. The control unit 1800 may control the cleaner to predict (or infer) at least one executable operation and execute an operation having the highest feasibility among the predicted at least one operation, by using the information learned using the machine running technology.

Machine learning technology is a technology that collects and learns a large amount of information based on at least one algorithm, and judges and predicts information based on the learned information. The learning of information is an operation that grasps characteristics, rules, and judgment criteria of information, quantifies relationship between information and information, and predicts new data using a quantified pattern.

The at least one algorithm used by the machine learning technology may be a statistical based algorithm for example, a decision tree that uses a tree structure type as a prediction model, an artificial neural network copying neural network architecture and functions, genetic programming based on biological evolutionary algorithms, clustering to distribute observed examples into subsets of clusters, Monte Carlo method to compute function values through randomly extracted random numbers from probability, or the like.

As a field of machine learning technology, deep learning is a technique that performs at least one of learning, judging, and processing of information using an Artificial Neural Network (ANN) or a Deep Neuron Network (DNN) algorithm. Such DNN may have an architecture in which layers are connected to transfer data between layers. This deep learning technology may allow learning of a large amount of information through the DNN using a graphic processing unit (GPU) optimized for parallel computing.

The control unit 1800 may use training data stored in an external server or memory, and may include a learning engine mounted to detect characteristics for recognizing a predetermined object. At this time, the characteristics for recognizing the object may include a size, shape and shade of the object.

Specifically, when the control unit 1800 inputs a part of images acquired through the camera provided on the cleaner into the learning engine, the learning engine may recognize at least one object or organism included in the input images.

When the learning engine is applied to traveling of the cleaner, the control unit 1800 can recognize whether or not an obstacle such as a chair leg, a fan, and a specific shape of balcony gap, which obstruct the running of the cleaner, exists around the cleaner. This may result in enhancing efficiency and reliability of the traveling of the cleaner.

On the other hand, the learning engine may be mounted on the control unit 1800 or on an external server. When the learning engine is mounted on an external server, the control unit 1800 may control the communication unit 120 to transmit at least one image to be analyzed, to the external server.

The external server may input the image transmitted from the cleaner into the learning engine and thus recognize at least one object or organism included in the image. In addition, the external server may transmit information related to the recognition result back to the cleaner. In this case, the information related to the recognition result may include information related to the number of objects included in the image to be analyzed and a name of each object.

On the other hand, the traveling unit 1300 may include a motor, and operate the motor to bidirectionally rotate left and right main wheels, so that the main body can rotate or move. At this time, the left and right main wheels may be independently moved. The travel unit 1300 may advance the main body of the mobile robot forward, backward, left, right, curvedly, or in place.

Meanwhile, the input unit 1200 receives various control commands for the robot cleaner from the user. The input unit 1200 may include one or more buttons, for example, the input unit 1200 may include an OK button, a setting button, and the like. The OK button is a button for receiving a command for confirming detection information, obstacle information, position information, and map information from the user, and the setting button is a button for receiving a command for setting those information from the user.

In addition, the input unit 1200 may include an input reset button for canceling a previous user input and receiving a new user input, a delete button for deleting a preset user input, a button for setting or changing an operation mode, a button for receiving an input to return to the charging base, and the like.

In addition, the input unit 1200 may be implemented as a hard key, a soft key, a touch pad, or the like and may be disposed on a top of the moving robot. For example, the input unit 1200 may implement a form of a touch screen together with the output unit 1500.

On the other hand, the output unit 1500 ay be installed on a top of the moving robot. Of course, the installation position and installation type may vary. For example, the output unit 1500 may display a battery level state, a traveling mode or manner, or the like on a screen.

The output unit 1500 may output internal status information of the moving robot detected by the sensing unit 1400, for example, a current status of each component included in the moving robot. The output unit 1500 may also display external status information detected by the sensing unit 1400, obstacle information, position information, map information, and the like on the screen. The output unit 1500 may be configured as one device of a light emitting diode (LED), a liquid crystal display (LCD), a plasma display panel, and an organic light emitting diode (OLED).

The output unit 1500 may further include an audio output module for audibly outputting information related to an operation of the moving robot executed by the control unit 1800 or an operation result. For example, the output unit 1500 may output a warning sound to the outside in accordance with a warning signal generated by the control unit 1800.

In this case, the audio output module (not shown) may be means, such as a beeper, a speaker or the like for outputting sounds, and the output unit 1500 may output sounds to the outside through the audio output module using audio data or message data having a predetermined pattern stored in the memory 1700.

Accordingly, the moving robot according to an implementation of the present disclosure can output environmental information related to a traveling area through the output unit 1500 or output the same in an audible manner. According to another implementation, the moving robot may transmit map information or environmental information to a terminal device through the communication unit 1100 so that the terminal device outputs a screen to be output through the output unit 1500 or sounds.

The memory 1700 stores a control program for controlling or driving the robot cleaner and data corresponding thereto. The memory 1700 may store audio information, image information, obstacle information, position information, map information, and the like, Also, the memory 1700 may store information related to a traveling pattern.

The memory 1700 mainly uses a nonvolatile memory. Here, the non-volatile memory (NVM, NVRAM) is a storage device that can continuously store information even when power is not supplied. Examples of the storage device include a ROM, a flash memory, a magnetic computer storage device (e.g., a hard disk, a diskette drive, a magnetic tape), an optical disk drive, a magnetic RAM, a PRAM, and the like.

On the other hand, the sensing unit 1400 may include at least one of an external signal sensor, a front sensor, a cliff sensor, a two-dimensional (2D) camera sensor, and a three-dimensional (3D) camera sensor.

The external signal sensor or external signal detection sensor may sense an external signal of the moving robot. The external signal detection sensor may be, for example, an infrared ray sensor, an ultrasonic sensor, a radio frequency (RF) sensor, or the like.

The moving robot may detect a position and direction of the charging base by receiving a guidance signal generated by the charging base using the external signal sensor. At this time, the charging base may transmit a guidance signal indicating a direction and distance so that the moving robot can return thereto. That is, the moving robot may determine a current position and set a moving direction by receiving a signal transmitted from the charging base, thereby returning to the charging base.

On the other hand, the front sensors or front detection sensors may be installed at a predetermined distance on the front of the moving robot, specifically, along a circumferential surface of a side surface of the moving robot. The front sensor is located on at least one side surface of the moving robot to detect an obstacle in front of the moving robot. The front sensor may detect an object, especially an obstacle, existing in a moving direction of the moving robot and transmit detection information to the control unit 1800. That is, the front sensor may detect protrusions on the moving path of the moving robot, household appliances, furniture, walls, wall corners, and the like, and transmit the information to the control unit 1800.

For example, the frontal sensor may be an infrared ray (IR) sensor, an ultrasonic sensor, an RE sensor, a geomagnetic sensor, or the like, and the moving robot may use one type of sensor as the front sensor or two or more types of sensors if necessary.

An ultrasonic sensor, for example, may generally be used to detect a remote obstacle. The ultrasonic sensor may be provided with a transmitter and a receiver. The control unit 1800 may determine presence or non-presence of an obstacle according to whether ultrasonic waves radiated from the transmitter are reflected by an obstacle or the like and then received by the receiver, and calculate a distance from the obstacle using an ultrasonic wave radiation time and an ultrasonic wave reception time.

Furthermore, the control unit 1800 may compare ultrasonic waves emitted from the transmitter and ultrasonic waves received at the receiver to detect information related to a size of the obstacle. For example, the control unit 1800 may determine that the obstacle is larger in size when more ultrasonic waves are received in the receiver.

In one implementation, a plurality of (for example, five) ultrasonic sensors may be provided along a lateral outer circumferential surface at a front side of the moving robot. At this time, the ultrasonic sensors may preferably be installed on the front surface of the moving robot in a manner that the transmitter and the receiver are alternately arranged.

That is, the transmitters may be disposed at right and left sides with being spaced apart from a front center of the main body or one transmitter or at least two transmitters may be disposed between the receivers so as to form a reception area of an ultrasonic signal reflected from an obstacle or the like. With this arrangement, the reception area can increase while reducing the number of sensors. A radiation angle of ultrasonic waves may be maintained in a range of avoiding an affection to different signals so as to prevent a crosstalk. Also, receiving sensitivity of the receivers may be set differently.

In addition, the ultrasonic sensor may be installed upward by a predetermined angle so that the ultrasonic waves emitted from the ultrasonic sensor are output upward. In this instance, the ultrasonic sensor may further include a predetermined blocking member to prevent the ultrasonic waves from being radiated downward.

On the other hand, as described above, the front sensor may be implemented by using two or more types of sensors together, and thus the front sensor may use any one of an IR sensor, an ultrasonic sensor, an RF sensor and the like.

For example, the front sensor may include an IR sensor as another sensor, in addition to the ultrasonic sensor.

The IR sensor may be installed on an outer circumferential surface of the moving robot together with the ultrasonic sensor. The infrared sensor may also sense an obstacle existing at the front or the side to transmit obstacle information to the control unit 1800. That is, the IR sensor senses a protrusion, a household fixture, furniture, a wall, a wall edge, and the like, existing on the moving path of the moving robot, and transmits detection information to the control unit 1800. Therefore, the moving robot can move within a specific area without collision with an obstacle.

On the other hand, a cliff sensor (or cliff detection sensor) may detect an obstacle on the floor supporting the main body of the moving robot by mainly using various types of optical sensors.

That is, the cliff sensor may also be installed on a rear surface of the moving robot on the floor, but may be installed on a different position depending on a type of the moving robot. The cliff sensor is located on the rear surface of the moving robot and detects an obstacle on the floor. The cliff sensor may be an IR sensor, an ultrasonic sensor, an RF sensor, a Position Sensitive Detector (PSD) sensor, and the like, which include a transmitter and a receiver, similar to the obstacle detection sensor.

For example, one of the cliff sensors may be installed on the front of the moving robot, and two other cliff sensors may be installed relatively behind.

For example, the cliff sensor may be a PSD sensor, but may alternatively be configured by a plurality of different kinds of sensors.

The PSD sensor detects a short/long distance location of incident light at one p-n junction using semiconductor surface resistance. The PSD sensor includes a one-dimensional PSD sensor that detects light only in one axial direction, and a two-dimensional PSD sensor that detects a light position on a plane. Both of the PSD sensors may have a pin photodiode structure. The PSD sensor is a type of infrared sensor that uses infrared rays to transmit infrared rays and then measure an angle of infrared rays reflected from and returned back to an obstacle so as to measure a distance. That is, the PSD sensor calculates a distance from the obstacle by using the triangulation method.

The PSD sensor includes a light emitter that emits infrared rays to an obstacle and a light receiver that receives infrared rays that are reflected and returned from the obstacle, and is configured typically as a module type. When an obstacle is detected by using the PSD sensor, a stable measurement value may be obtained irrespective of reflectivity and color difference of the obstacle.

The control unit 1800 may measure an infrared angle between an emission signal of infrared rays emitted from the cuff detection sensor toward the ground and a reflection signal received by being reflected from the obstacle, to sense a cliff and analyze depth thereof.

Meanwhile, the control unit 1800 may determine whether to pass a cliff or not according to a ground state of the detected cliff by using the cliff detection sensor. and decide whether to pass the cliff or not according to the determination result. For example, the control unit 1800 determines presence or non-presence of a cliff and a depth of the cliff through the cliff sensor, and then allows the moving robot to pass through the cliff only when a reflection signal is detected through the cuff sensor.

As another example, the control unit 1800 may also determine lifting of the moving robot using the cliff sensor.

On the other hand, the two-dimensional camera sensor is provided on one surface of the moving robot to acquire image information related to the surroundings of the main body during movement.

An optical flow sensor converts a lower image input from an image sensor provided in the sensor to generate image data of a predetermined format. The generated image data may be stored in the memory 1700.

Also, at least one light source may be installed adjacent to the optical flow sensor. The at least one light source emits light to a predetermined area of the floor, which is captured by the image sensor. That is, while the moving robot moves in a specific area along the floor surface, a constant distance is maintained between the image sensor and the floor surface when the floor surface is flat. On the other hand, when the moving robot moves on a floor surface which is not flat, the image sensor and the floor surface are spaced apart from each other by a predetermined distance due to an unevenness and an obstacle on the floor surface. At this time, the at least one light source may be controlled by the control unit 1800 to adjust an amount of light to be emitted. The light source may be a light emitting device, for example, a light emitting diode (LED), which is capable of adjusting an amount of light.

The control unit 1800 may detect a position of the moving robot irrespective of slippage of the moving robot, using the optical flow sensor. The control unit 1800 may compare and analyze image data captured by the optical flow sensor according to time to calculate a moving distance and a moving direction, and calculate a position of the moving robot based on the calculated moving distance and moving direction. By using the image information regarding the lower side of the moving robot captured by the optical flow sensor, the control unit 1800 may perform correction that is robust against slippage with respect to the position of the moving robot calculated by another member.

A The three-dimensional (3D) camera sensor may be attached to one surface or a part of the main body of the moving robot to generate 3D coordinate information related to surroundings of the main body.

That is, the 3D camera sensor may be a 3D depth camera that calculates a remote/near distance between the moving robot and an object to be captured.

Specifically, the 3D camera sensor may capture 20 images related to surroundings of the main body, and generate a plurality of 3D coordinate information corresponding to the captured 20 images.

In one implementation, the 3D camera sensor may be configured in a stereoscopic vision type which includes two or more cameras for acquiring 20 images, and merges at least two images acquired by the two or more cameras to generate a 3D coordinate information.

Specifically, the 3D camera sensor according to the implementation may include a first pattern irradiating portion for downwardly irradiating light of a first pattern toward the front of the main body, a second pattern irradiating portion for upwardly irradiating light of a second pattern toward the front of the main body, and an image acquiring portion for acquiring a front image of the main body. Thus, the image acquiring portion may acquire an image of an area where the light of the first pattern and the light of the second pattern are incident.

In another implementation, the 3D camera sensor may include an infrared pattern irradiating portion for irradiating an infrared pattern, in addition to a single camera, and capture a shape that the infrared pattern irradiated from the infrared pattern irradiating portion is projected onto an object to be captured, thereby measuring a distance between the 3D camera sensor and the object to be captured. The 3D camera sensor may be an IR type 3D camera sensor.

In another implementation, the 3D camera sensor may include a light emitting portion for emitting light, in addition to a single camera. The 3D camera sensor may receive a part of laser light (or laser beam), which is emitted from the light emitting portion and reflected from an object to be captured, and analyze the received light, thereby measuring a distance between the 3D camera sensor and the object to be captured. The 3D camera sensor may be a time-of-flight (TOF) type 3D camera sensor.

Specifically, the laser of the 3D camera sensor is configured to irradiate a laser beam extending in at least one direction, In one example, the 3D camera sensor may be provided with first and second lasers. The first laser irradiates linear laser beams intersecting each other, and the second laser irradiates single linear laser beam. According to this, the lowermost laser is used to detect an obstacle on a bottom, the uppermost laser is used to detect an obstacle on a top, and an intermediate laser between the lowermost laser and the uppermost laser is used to detect an obstacle at a middle portion.

On the other hand, the communication unit 1100 is connected to a terminal device and/or another device (also referred to as "home appliance" herein) through one of wired, wireless and satellite communication methods, so as to transmit and receive signals and data.

The communication unit 1100 may transmit and receive data with another device located in a specific area. In this case, the another device may be any device if it can transmit and receive data through a network. For example, the another device may be an air conditioner, a heating device, an air purifier, a lamp, a TV, a vehicle, and the like. The another device may also be a device for controlling a door, a window, a water supply valve, a gas valve, or the like. The another device may also be a sensor for detecting temperature, humidity, air pressure, gas, or the like.

Further, the communication unit 1100 may communicate with another robot cleaner 100 located in a specific area or within a predetermined range.

Figure 5A:
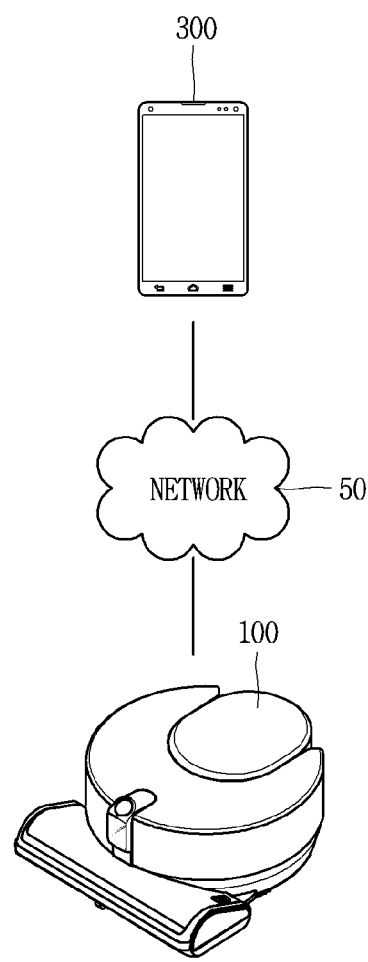
FIG. 5A is a conceptual view illustrating network communication between a robot cleaner and a remote control device according to one implementation of the present disclosure.
Figure 5B:
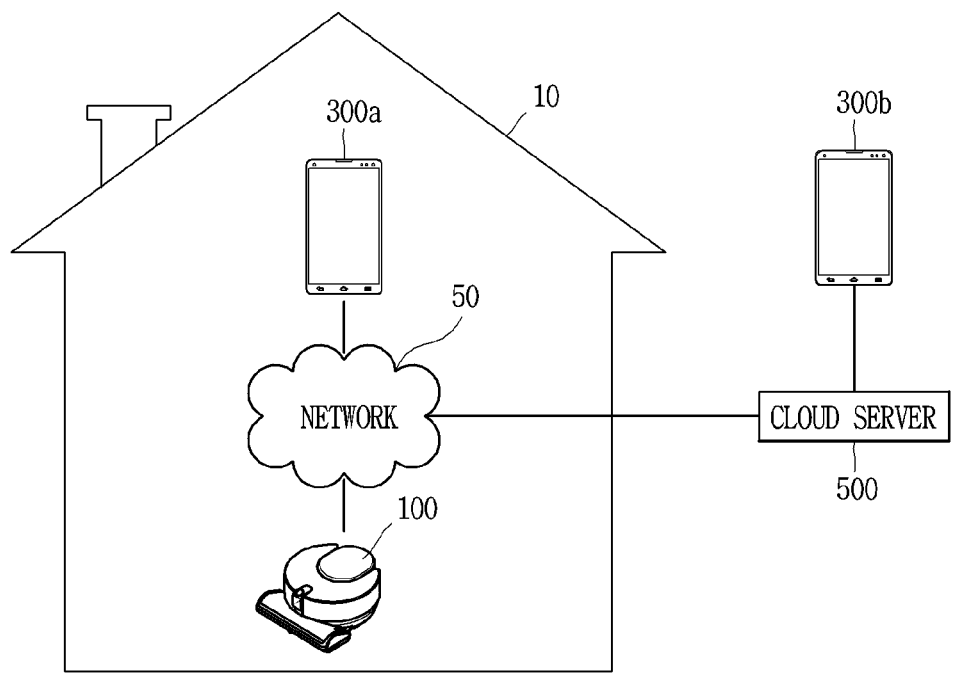
FIG. 5B is a conceptual view illustrating another example of the network communication of FIG. 5A.

FIG. 5A is a conceptual view illustrating network communication between the robot cleaner 100 and a terminal 300, and FIG. 5B is a conceptual view illustrating another example of the network communication of FIG. 5A, Referring to FIGS. 5A and 5B, the robot cleaner 100 may exchange data with the terminal 300 through the network communication 50. In addition, the robot cleaner 100 may perform a cleaning-related operation or an operation corresponding to cleaning according to a control command received from the terminal 300 through network communication or other communication.

Here, the network communication 50 may refer to short-range communication using at least one of wireless communication technologies, such as a wireless LAN (WLAN), a wireless personal area network (WPAN), a wireless fidelity (Wi-Fi) Wi-Fi direct, Digital Living Network Alliance (DLNA), Wireless Broadband (WiBro), World Interoperability for Microwave Access (WiMAX), Zigbee, Z-wave, Blue-Tooth, Radio Frequency Identification (RFID), Infrared Data Association (IrDA), Ultrawide-Band (UWB), Wireless Universal Serial Bus (USB), and the like.

The illustrated network communication may vary depending on a communication method of the robot cleaner.

In FIG. 5A, the robot cleaner 100 may provide information sensed through each sensing unit to the terminal 300 through the network communication 50. In addition, the terminal 300 may transmit a control command generated based on the received information to the robot cleaner 100 through the network communication 50.

In FIG. 5A, a communication unit of the robot cleaner 100 and a communication unit of the terminal 300 may also directly communicate with each other in a wireless manner or indirectly communicate with each other via another router (not shown), to recognize information related to a travel operation of the robot cleaner and positions of the robot cleaner and the terminal.

Hereinafter, a system including a robot cleaner 100 performing autonomous travel according to an implementation of the present disclosure will be described with reference to FIG. 5B.

As illustrated in FIG. 5B, a cleaning system according to an implementation of the present disclosure may include a robot cleaner 100 performing autonomous travel, a network 50, a server 500, and a plurality of terminals 300*a* and 300*b*.

The robot cleaner 100, the network 50 and at east one terminal 300*a* may be disposed in a building 10 while another terminal 300*b* and the server 500 may be located outside the building 10.

The robot cleaner 100 may be a cleaner that performs cleaning while traveling by itself, and may perform autonomous travel and autonomous cleaning. The robot cleaner 100 may include a communication unit 1100, in addition to the traveling function and the cleaning function.

The robot cleaner 100, the server 500 and the plurality of terminals 300*a* and 300*b* may be connected together through the network 50 to exchange data. To this end, although not shown, a wireless router such as an access point CAP) device and the like may further be provided. In this case, the terminal 300*a* located in the internal network 50 of the building 10 may access the robot cleaner 100 through the AP device so as to perform monitoring, remote control and the like with respect to the cleaner. Also, the terminal 300*b* located in an external network may access the robot cleaner 100 through the AP device, to perform monitoring, remote control and the like with respect to the cleaner.

The server 500 may be wirelessly connected directly through the terminal 300b. Alternatively, the server 500 may be connected to the robot cleaner 100 without passing through the terminal 200.

The server 500 may include a programmable processor and may include various algorithms. By way of example, the server 500 may be provided with algorithms related to performing machine learning and/or data mining. As an example, the server 500 may include a speech recognition algorithm. In this case, when receiving voice data, the received voice data may be output by being converted into data in a text format.

Meanwhile, the server 500 may store firmware information and driving information (course information, and the like) for the robot cleaner 100, and register product information related to the robot cleaner 100. For example, the server 500 may be a server managed by a cleaner manufacturer or a server managed by an open application store operator.

In another example, the server 500 may be a home server that is provided in the internal network 50 and stores status information regarding home appliances or stores contents shared by the home appliances. If the server 500 is the home server, information related'to foreign substances, for example, foreign substance images and the like may be stored in the server.

Meanwhile, the robot cleaner 100 and the terminals may be directly connected to each other wirelessly via Zigbee, Z-wave, Blue-Tooth, Ultra-wide band, and the like.

Hereinafter, functions, configurations, and operations of the remote control device 200 described herein may correspond to the functions, configurations, and operations of the terminal 300 described above. Accordingly, if there is no particular limitation, the remote control device 200 described in the present disclosure may be replaced by the terminal 300 described above.

In addition, the robot cleaner 100 of the present disclosure may be referred to as an autonomous cleaner or a cleaner. Also, the remote control device 200 may be named as a controller, a remote controller, a terminal, or the like, which is operated by a user to control operations related to the travel of the robot cleaner 100.

Meanwhile, the robot cleaner 100 according to the present disclosure may perform cleaning by moving to a specific area/point by itself when a user manipulates the remote control device to point to the specific area/point. This will be referred to as 'pointing cleaning'.

That is, the term 'pointing cleaning' used in the present disclosure means that a robot cleaner cleans an area pointed/designated by using a remote control device while moving by itself.

Meanwhile, in the related art, when the user points to a specific area/point by emitting a laser beam signal through the remote control device in order to perform the pointing cleaning. if the user is located far from the robot cleaner (e.g., 5 to 10 m) or an obstacle is present between the user and the robot cleaner, the laser beam signal does not reach up to the robot cleaner, thereby failing to performing the pointing cleaning.

In other words, in order to perform the pointing cleaning in the related art, there is a disadvantage that a distance between the remote control device and the robot cleaner should be as short as possible.

However, the present disclosure can perform pointing cleaning for an area/point far apart from the robot cleaner without a user's operation to call the robot cleaner or perform drag travel after moving close to the robot cleaner, even when the user manipulating a remote control device is located far from the robot cleaner or an obstacle is present between the user and the robot cleaner.

First, the configuration of the remote control device 200 performing communication with the robot cleaner 100 for pointing cleaning according to the present disclosure will be described in detail with reference to FIG. 6.

The robot cleaner 100 may transmit a UWB signal through a UWB module 610 provided therein so as to perform communication with the remote control device 200 having another UWB module 210.

The robot cleaner 100 may also perform communication with the remote control device 200 by receiving a UWB signal from the UWB module 210 of the remote control device 200. For example, the pointing cleaning operation may be initiated by using a UWB signal, which is first received from the remote control device 200, as a trigger signal.

Figure 6:
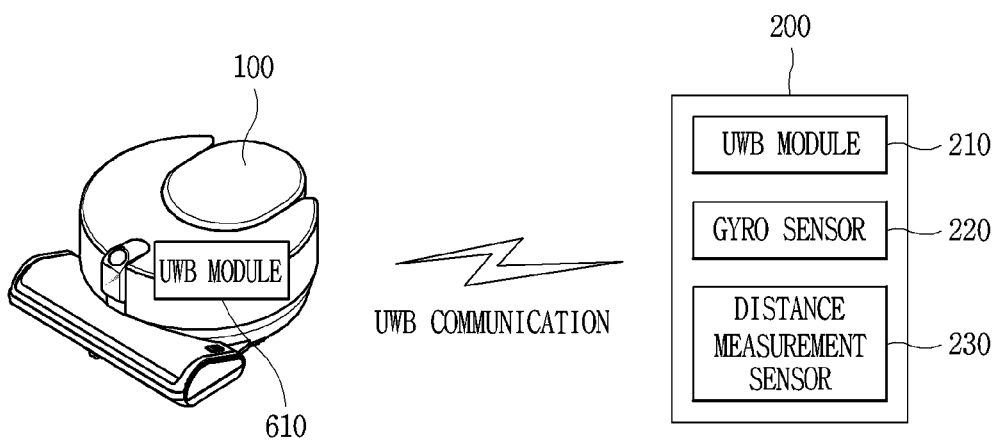
FIG. 6 is a block diagram illustrating an exemplary configuration of a remote control device that performs communication with a robot cleaner for pointing cleaning, in accordance with one implementation of the present disclosure.

As illustrated in FIG. 6, the remote control device 200 may further include a gyro sensor 220 and a distance measurement sensor 230 in addition to the UWB module 210.

The gyro sensor 220 may detect a change in a three-axis value according to the movement of the remote control device 200. Specifically, the remote control device 200 may detect an angular velocity according to its movement by which at least one of x, y and z-axis values is changed.

Also, the gyro sensor 220 may use x, y, and z-axis values, which are detected at a specific time point, as a reference point, and detect x', y', and z'-axis values that change with respect to the reference point after reception of a predetermined input/a lapse of a predetermined period of time. To this end, the remote control device 200 may further include a magnetic sensor (not shown) and an acceleration sensor (not shown) as well as the gyro sensor 220.

The distance measurement sensor 230 may emit at least one of a laser light signal, an IR signal, an ultrasonic signal, a carrier frequency, and an impulse signal, and may calculate a distance from the remote control device 200 to the corresponding signal based on a reflected signal.

To this end, the distance measurement sensor 230 may include, for example, a time of flight (ToF) sensor. For example, the ToF sensor may include a transmitter that emits an optical signal transformed to a specific frequency, and a receiver that receives and measures a reflected signal. When the ToF sensor is installed in the remote control device 200, the transmitter and the receiver may be spaced apart from each other to avoid signal affection therebetween.

Hereinafter, the laser light signal, the IR signal, the ultrasonic signal, the carrier frequency, and the impulse signal described above may collectively be referred to as 'optical signal'. Therefore, it can be said that the distance measurement sensor 230 plays a role of calculating a distance to a point where the remote control device 200 emits a signal. In addition, the distance measurement sensor 230 may include a transmitter that emits optical signals and one receiver or a plurality of receivers for receiving reflected signals.

Further, although not shown, the remote control device 200 according to the present disclosure may include at least one through hole through which the optical signal passes, and additionally include an input button for transmitting an optical signal, and a component for emitting an optical signal after modifying the optical signal.

Meanwhile, the robot cleaner 100 and the remote control device 200 may determine their relative positions using an Ultra-wide Band (UWB) technology. To this end, one of the UWB modules 610 and 210 may be a UWB anchor and the other one may be a UWB tag.

Hereinafter, description will be given on the assumption that the UWB module 210 of the remote control device 200 operates 'UWB tag' emitting a UWB signal and the UWB module 610 of the robot cleaner 100 operates as 'UWB anchor' receiving the emitted UWB signal.

However, it should be noted that the present disclosure is not limited to this. For example, the UWB module 210 of the remote control device 200 may operate as a UWB anchor, and the UWB module 610 of the robot cleaner 100 may operate as a UWB tag. Alternatively, the UWB modules 210 and 610 may include one UWB anchor and a plurality of UWB tags.

Hereinafter, description will be given of a method by which the robot cleaner 100 and the remote control device 200 determine (recognize) their relative positions through a UWB technology. First, a distance between the robot cleaner 100 and the remote control device 200 may be calculated using a distance measurement technology such as a ToF (Time of Flight) scheme.

Specifically, a first impulse signal, which is a UWB signal radiated (emitted) from the remote control device 200, may be transmitted to the robot cleaner 100. To this end, the UWB module of the remote control device 200 may operate as 'UWB tag' for transmission and the UWB module of the robot cleaner 100 may operate as 'UWB anchor' for reception.

Here, the UWB signal (or the impulse signal) may be smoothly transmitted and received even if an obstacle exists in a specific space, and the specific space may have a radius of several tens of meters (m).

The first impulse signal may be received through the UWB anchor of the robot cleaner 100. The robot cleaner 100 which has received the first impulse signal may transmit a response signal to the remote control device 200. Then, the remote control device 200 may transmit a second impulse signal, which is a UWB signal with respect to the response signal, to the robot cleaner 100.

Here, the second impulse signal may include delay time information which is calculated based on a time at which the response signal has been received and a time at which the second impulse signal has been transmitted responsive to the response signal.

The control unit of the robot cleaner 100 may then calculate a distance between the robot cleaner 100 and the remote control device 200, based on a time at which the response signal has been transmitted, a time at which the second UWB signal has been arrived at the UWB anchor of the robot cleaner 100, and the delay time information included in the second. UWB signal.

Here, t2 denotes an arrival time of the second impulse signal, t1 denotes a transmission time of the response signal, treply denotes a delay time, and c denotes a constant value indicating a speed of light.

As such, the distance between the robot cleaner 100 and the remote control device 200 may be determined (calculated) by measuring a time difference between signals transmitted and received between the UWB tag and the UWB anchor included in the robot cleaner 100 and the remote control device 200.

Figure 7:
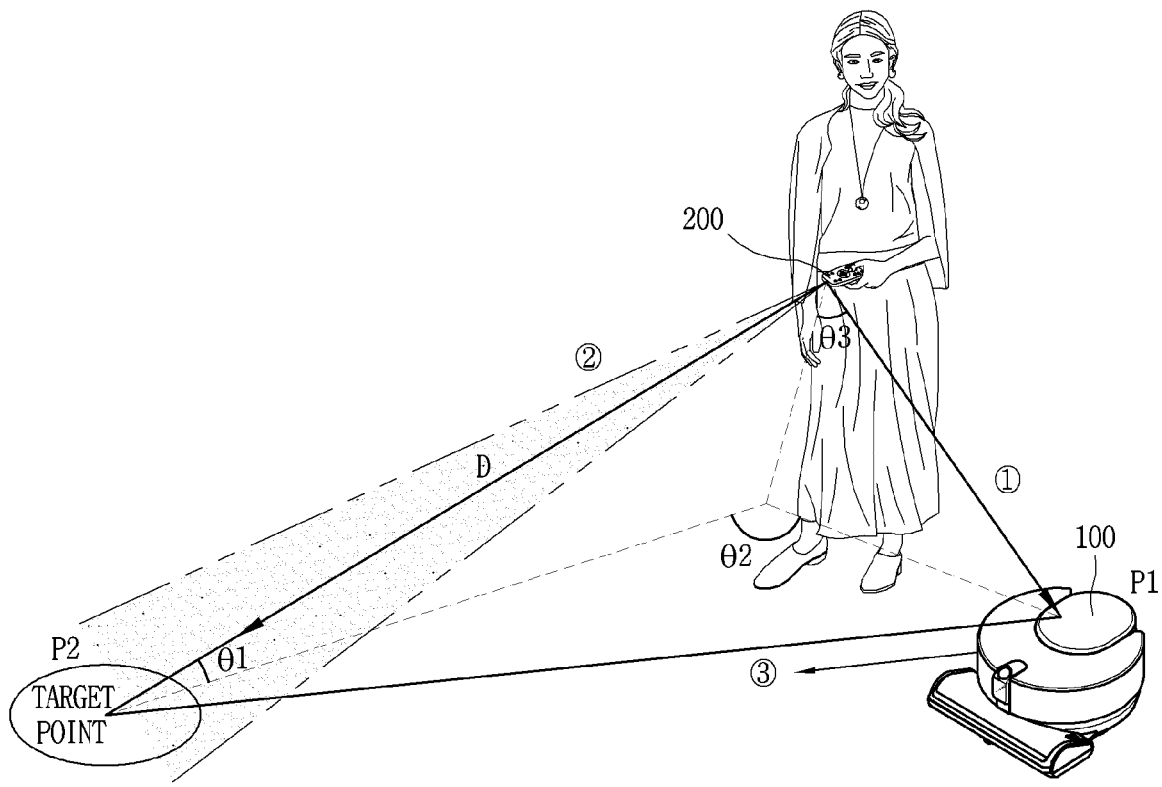
FIG. 7 is an exemplary conceptual view illustrating an operation by which a robot cleaner according to an implementation of the present disclosure travels to a target point pointed using a remote control device according to a first implementation.

Hereinafter, an operation by which the robot cleaner travels toward a target point (spot, place, position) pointed using the remote control device 200 according to a first implementation of the present disclosure will be described in detail, with reference to FIG. 7.

First, the user may point to the robot cleaner 100 using the remote control device 200 (①), and then perform an input for emitting a first optical signal. In this case, it does not matter that the remote control device 200 and the robot cleaner 100 are far apart from each other. For example, even if the remote control device 200 and the robot cleaner 100 are several meters (m) or tens of meters (m) apart from each other within a specific space, a pointing cleaning operation according to the present disclosure may be performed.

Here, the first optical signal may be an impulse signal that is a UWB signal. In addition, the first optical signal may serve as a trigger signal for initiating a pointing cleaning operation.

The robot cleaner 100 pointed through the first optical signal may become a zero point for calculating a relative position of the remote control device 200.

In addition, although it will be described in more detail below, a posture value, namely, x, y, and z-axis values, of the remote control device 200 at a time point when the remote control device 200 points to the robot cleaner 100, may become a reference point for calculating an angle required to calculate a position of a target point to be pointed by the remote control device 200 later.

In one example, pointing of the remote control device 200 to the robot cleaner 100 may be replaced with pointing to a fixed charging station. For example, when the robot cleaner 100 is located adjacent to a fixed charging station, when the robot cleaner 100 is far from the user or when the robot cleaner 100 is out of view due to an obstacle, the fixed charging station may be a zero point for receiving a trigger signal.

In response to the first optical signal the robot cleaner 100 may obtain a spaced distance from the remote control device 200 by using the ToF technology which uses the aforementioned UWB tag and UWB anchor. Furthermore, the relative position of the remote control device 200 may be calculated by obtaining a direction of the remote control device 200 based on a direction in which the first optical signal is received.

Accordingly, even if an obstacle exists between the remote control device 200 and the robot cleaner 100, a problem of blocking reception which occurs when emitting a laser beam in the related art may be solved, Next, the user may point to a target point (or area) to perform the pointing cleaning by using the remote control device 200 Accordingly, the user may emit a second optical signal to the specific target point using the remote control device 200.

In response to the second optical signal, the robot cleaner 100 may recognize a position P2 of the target point corresponding to the second optical signal, which is determined based on the position of the remote control device 200.

As a first example, the control unit of the robot cleaner 100 may transmit first coordinate information (x1, y1, z1), which correspond to the relative position of the remote control device 200 determined based on coordinates (0, 0, 0) of a main body of the robot cleaner 100, to the remote control device 200 so as to calculate second coordinate information (x2, y2, z2) corresponding to the position P2 of the remote control device 200, Then, the remote control device 200 may transmit third coordinate information (x2', 2', z2') that is calculated based on the second coordinate information (x2, y2, z2) and the position of the robot cleaner 100. The robot cleaner 100 may determine the position. P2 of the target point by checking the third coordinate information (x2', y2', z2').

As a second example, the control unit of the robot cleaner 100 may obtain the first coordinate information (x1, y1, z1) corresponding to the relative position of the remote control device 200, which is determined based on the coordinates (0, 0, 0) of the main body. Further, the control unit of the robot cleaner 100 may receive the second coordinate information (x2, y2, z2) corresponding to the relative position of the target point, which has been calculated based on the remote control device 200, from the remote control device 200.

Thus, the control unit of the robot cleaner 100 may estimate the position P2 of the target point relative to the main body of the robot cleaner 100 based on the first coordinate information and the second coordinate information.

Hereinafter, a detailed method of acquiring coordinate information of the position P2 of the target point relative to the robot cleaner 100 will be described.

First, distance information D to the target point may be easily obtained based on the second optical signal emitted from the remote control device 200. Then, coordinate information regarding the target point relative to the robot cleaner 100 may be calculated by multiplying a coordinate transformation matrix, which includes angles θ1, θ2, and θ3 shown in FIG. 7 and the coordinate information (x1, y1, z1) of the remote control device 200 obtained by using the robot cleaner 100 as a zero point, by the distance information D from the remote control device 200 to the target point.

A first angle θ1, a second angle 82, and a third angle θ3 may be calculated, as follows, by using a posture value of the remote control device 200 at the time when the first optical signal is emitted, as a zero point.

First, the third angle θ3 may be calculated as follows.

The third angle θ3 may be an angle between a perpendicular line of the remote control device 200 with respect to the ground and an extension line from the remote control device 200 to the robot cleaner 100. When the remote control device 200 emits the first optical signal to the robot cleaner 100, an angle between a reference line of a geomagnetic axis and the extension line between the remote control device 200 and the robot cleaner 100 may be calculated by using the gyro sensor 210 provided in the remote control device 200. And, the angle θ3 shown in FIG. 7 between the extension line and the ground may be acquired.

Next, the first angle θ1 may be calculated as follows.

The first angle θ1 may be an angle between the ground and an extension line from the remote control device 200 to a target point, When the remote control device 200 emits the second optical signal to the target point, the reference line of the geomagnetic axis and the extension line between the remote control device 200 and the target point may be calculated by using the gyro sensor 210 provided in the remote control device 20C. In addition, by subtracting the calculated angle from 90 degrees, the angle θ1 shown in FIG. 7 between the extension line and the perpendicular line with respect to the ground may be acquired.

Finally, the second angle θ2 may correspond to a rotation angle of the remote control device 200.

That is, the second angle θ2 may be an angle between the extension line toward the robot cleaner 100 and an extension line toward the target point from a point on the ground corresponding to the position of the remote control device 200. The second angle θ2 may be calculated based on variations of yaw and pitch detected in the remote control device 200, by using a posture value at a time point, at which the remote control device 200 points to the robot cleaner 100, as a zero point.

When the position P2 of the target point corresponding to the second optical signal is determined, the control unit of the robot cleaner 100 may generate a travel command for moving the main body to the determined position of the target point. The robot cleaner 100 may move from a current position P1 to the position P2 of the target point according to the generated travel command (③).

At this time, since the robot cleaner 100 can recognize its current position P1 toward the position P2 of the target point, the robot cleaner 100 may turn in place before starting traveling and then travel to arrive at the position P2 of the target point at the shortest distance.

Hereinafter, an operation for performing pointing cleaning at a distance far from the robot cleaner according to the first implementation of the present disclosure will be described in detail with reference to FIG. 8.

Figure 8:
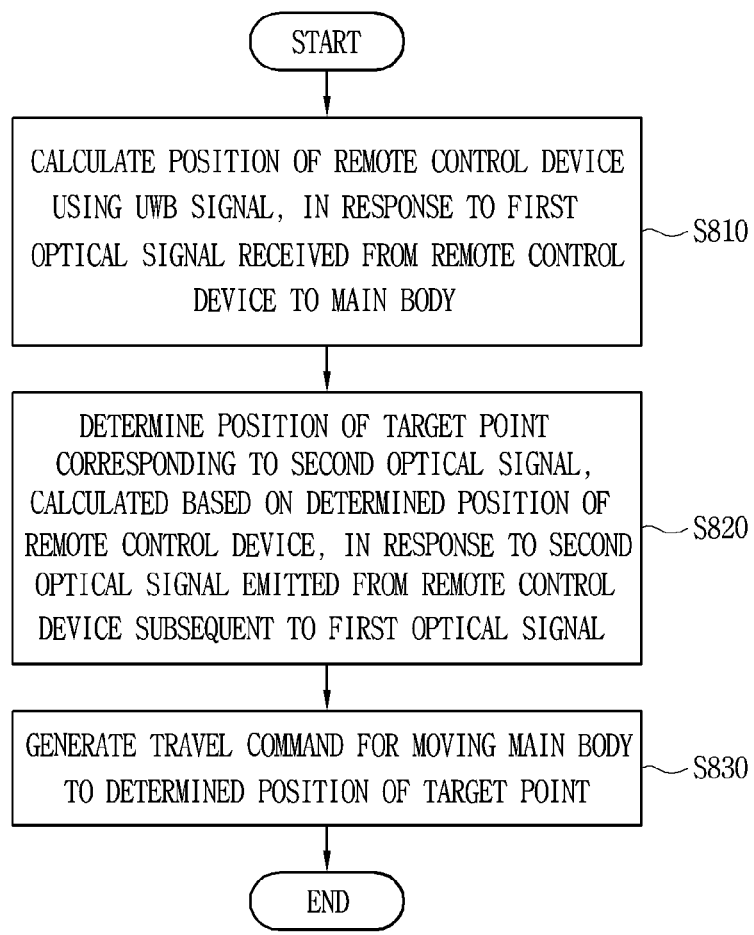
FIG. 8 is a conceptual view illustrating the exemplary conceptual view of FIG. 7 in detail.

Referring to FIG. 8, upon receiving a first optical signal from the remote control device 200 to the main body of the robot cleaner 100, the pointing cleaning function according to the present disclosure may be triggered. The robot cleaner 100 may calculate a relative position of the remote control device 200 using a UWB signal, in response to the first optical signal (S810).

Here, since the robot cleaner 100 and the remote control device 200 perform communication with each other using the UWB signals, they can determine relative positions therebetween even if the remote control device 200 manipulated by the user is far away from the robot cleaner 100 (e.g., 5 to 10 m).

To this end, the robot cleaner 100 may receive a UWB signal from a UWB module, namely, a UWB tag and/or UWB anchor.

Specifically, the robot cleaner 100 may receive a first optical signal (i.e., a first impulse signal transmitted through a UWB tag) from the remote control device 200 through the UWB module, that is, the UWB anchor, and transmit a response signal to the received UWB signal to the remote control device 200 in the form of a UWB signal. Then, the remote control device 200 may transmit a second impulse signal to the robot cleaner 200 through the UWB anchor, in response to the received response signal. Such signal exchange may be combined with the ToF technology described above to determine the relative position of the remote control device.

Next, when a second optical signal is emitted from the remote control device 200 to a specific target point directly after the first optical signal, the control unit of the robot cleaner 100 may determine the position of the target point corresponding to the second optical signal which is calculated based on the determined relative position of the remote control device 200 (S820).

Then, the control unit of the remote control device 200 may generate a travel command for moving the main body to the determined position of the target point (S830).

At this time, the control unit of the remote control device 200 may recognize or determine its own current position toward the target point, and turn in place based on a currently-traveling direction before moving toward the target point.

Hereinafter, an operation by which the robot cleaner travels toward a target point (spot, place, position) pointed using the remote control device according to a second implementation of the present disclosure will be described in detail, with reference to FIG. 9.

First, the user may point directly to a target point other than the robot cleaner 100 using the remote control device 200 (①), and then perform an input for emitting a first optical signal.

When an optical signal pointing to the target point is emitted, the robot cleaner 100 may recognize the relative position of the remote control device 200 through UWB communication. At this time, a time point at which the robot cleaner 100 recognizes the relative position of the remote control device 200 may be a time point closest to a time point when the remote control device 200 points to the target point, and it does not matter whether it is before or after the remote control device 200 points to the target point. That is, the relative position may be recognized based on a result of the UWB signal exchange that is carried out just before or after the time point when the remote control device 200 points to the target point.

At this time, since there is no trigger signal and zero point setting as in the first implementation a posture change value of the remote control device 200 may not be known. Therefore, the robot cleaner 100 cannot move from its current position directly to a position P3 of the target point, However, a distance D from the remote control device 200 to the pointed target point may be obtained based on an optical signal pointing to the target point. In addition, information related to the distance D may be transmitted to the robot cleaner 100.

Figure 9:
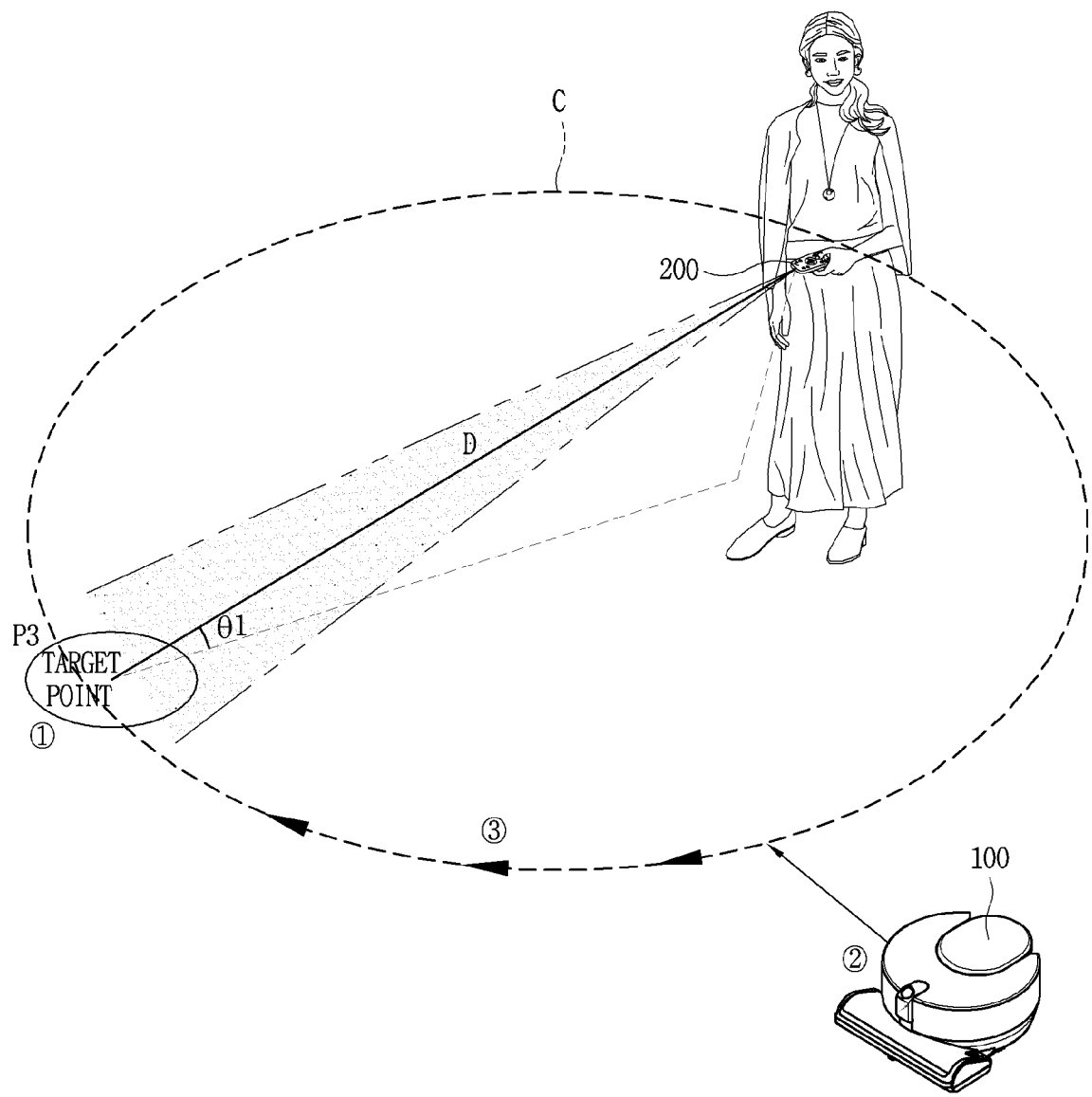
FIG. 9 is an exemplary conceptual view illustrating an operation by which a robot cleaner according to one implementation of the present disclosure travels to a target point along a virtual trajectory according to a second implementation.

Now, since the control unit of the robot cleaner 100 recognizes the relative position of the remote control device 200 and the distance between the remote control device 200 and the target point, as illustrated in FIG. 9, a virtual trajectory C centered on the position of the remote control device 200 and having the distance D as a radius may be generated. The target point pointed by the remote control device 200 may be located at a particular point on a path of the virtual trajectory C.

The robot cleaner 100 may perform a traveling operation to enter the virtual trajectory C according to a first travel command (②). Specifically, the control unit of the robot cleaner 100 may control the traveling unit to travel toward a point closest to a current position among a plurality of points forming the path of the virtual trajectory C.

When the robot cleaner 100 enters the virtual trajectory C, the control unit of the robot cleaner 100 may travel along the path of the virtual trajectory C according to a second travel command until arriving at the position P3 of the target point at which an optical signal has been received from the remote control device 200.

Meanwhile, in one implementation, a direction in which the robot cleaner 100 enters the virtual trajectory C may be determined based on a direction following the path of the virtual trajectory C. That is, the control unit of the robot cleaner 100 may determine the direction entering the virtual trajectory so that the main body of the robot cleaner 100 follows the path of the virtual trajectory C in a predetermined direction (e.g., clockwise).

Unlike the example of FIG. 9, when the following direction of the path of the virtual trajectory C is counterclockwise, the main body of the robot cleaner 100 may enter the virtual trajectory C in the counterclockwise direction while turning the front of the robot cleaner 100 to the right.

In addition, in one implementation, when an obstacle is detected while the robot cleaner 100 follows the path of the virtual trajectory C, the robot cleaner 100 may follow the path of the virtual trajectory C again at a time point when the obstacle is not detected any more while traveling along around an outer side of the obstacle. While the robot cleaner 100 travels around the outside of an obstacle, the robot cleaner 100 may temporarily deviate from the virtual trajectory C.

Figure 10:
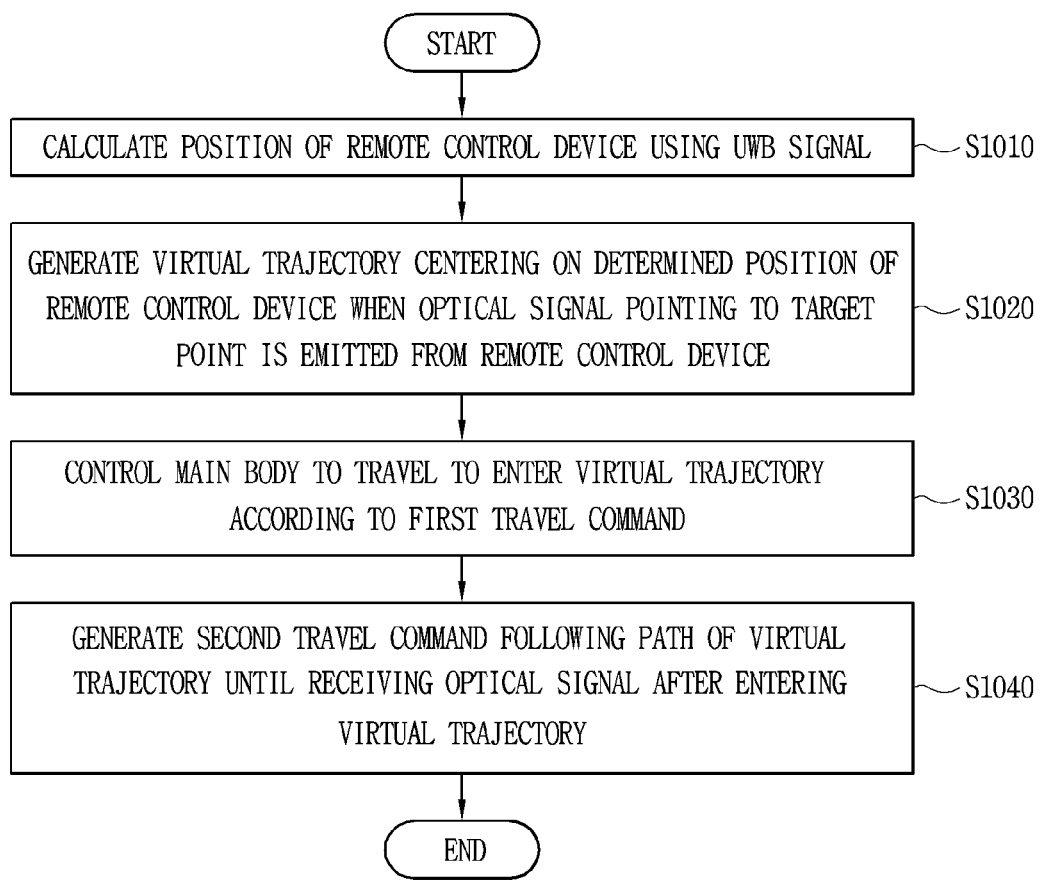
FIG. 10 is a conceptual view illustrating the exemplary conceptual view of FIG. 9 in detail.

Hereinafter, an operation for performing pointing cleaning at a distance far from the robot cleaner according to a second implementation of the present disclosure will be described in detail with reference to FIG. 10.

First, the robot cleaner 100 may calculate the position of the remote control device 200 using a UWB signal (S1010).

Here, without a trigger signal or a reference point as in the first implementation, the relative position of the remote control device 200 may be recognized based on an impulse signal emitted at a predetermined time interval from the UWB tag of the remote control device 200.

Specifically, the UWB anchor of the robot cleaner 100 may receive a first impulse signal emitted from the UWB tag of the remote control device 200. Next, the robot cleaner 100 may emit a response signal to the remote control device 200, and the remote control device 200 may emit a second impulse signal to the robot cleaner 100 in response to the response signal.

Thereafter, the robot cleaner 100 may measure a distance between the robot cleaner 100 and the remote control device 200 by calculating a round trip time according to the response signal transmitted by itself and the second impulse signal, Meanwhile, in measuring the relative position between the remote control device 200 and the robot cleaner 100, the relative position may also be measured by using one of received signal strength (RSS), time difference of arrival (TDoA), and angle of arrival (AoA), in addition to the aforementioned time of arrival (ToA).

Next, when the remote control device 200 emits an optical signal pointing to the target point, the control unit of the robot cleaner 100 may generate a virtual trajectory centering on the determined relative position of the remote control device 200 and having a radius corresponding to a distance up to the target point calculated by the remote control device 200 (S1020).

Next, the control unit of the robot cleaner 100 may output a first travel command and travel so that the main body of the robot cleaner 100 enters the virtual trajectory (S1030).

After entering the virtual trajectory, the robot cleaner 100 may perform a traveling operation according to a second travel command for following the path of the virtual trajectory until an optical signal emitted from the remote control device 200 is received (S1040).

While the robot cleaner 100 follows the path of the virtual trajectory, even if a modified impulse signal due to the change in the relative position of the remote control device 200 is received, the robot cleaner 100 may ignore the impulse signal.

In addition, in one implementation, in order to calculate an accurate position of a target point existing on the path of the virtual trajectory, when the robot cleaner 100 arrives near a point where the optical signal is received, the control unit of the robot cleaner 100 may accurately calculate a target point corresponding to the optical signal emitted from the remote control device based on signal strength using a plurality of receivers provided in the robot cleaner 100.

Or, in one example, the control unit of the robot cleaner 100 may alternatively transmit a signal for requesting the remote control device 200 to transmit a modified optical signal when the robot cleaner 100 arrives near the point where the optical signal is received. Here, the modified optical signal may be an optical signal having stronger signal strength or a more limited pointing range than the optical signal initially emitted from the remote control device 200.

In addition, in one implementation, when the robot cleaner 100 arrives at the target point, it may operate to perform cleaning by switching to a designated cleaning mode (e.g., a meticulous cleaning mode).

Hereinafter, an example of a method of changing a target point for pointing cleaning will be described in detail in relation to the second implementation, with reference to FIG. 11.

Referring to FIG. 11, while the robot cleaner 100 follows the path of the virtual trajectory C1 or, although not illustrated, while the robot cleaner 100 travels to enter the virtual trajectory C1, the remote control device 200 may emit a second optical signal corresponding to a changed target point T2.

As such, when an initial target point T1 is changed, the robot cleaner 100 may recognize the relative position of the remote control device 200 again, and additionally generate a second virtual trajectory C2 having a radius corresponding to a distance up to a changed target point T2 based on the re-recognized relative position. in this case, the robot cleaner 100 may stop the traveling operation.

When the second virtual trajectory C2 is generated, the control unit of the robot cleaner 100 may control the traveling unit according to a second travel command so that the robot cleaner 100 travels to enter the second virtual trajectory C2 from its current position P2.

Meanwhile, FIG. 11 exemplarily illustrates that only the target point is changed without a change in the relative position of the remote control device 200. However, the relative position of the remote control device 200 or a direction of entering a new virtual trajectory may also change.

In addition, the direction of entering the second virtual trajectory C2 may vary depending on a current traveling direction of the robot cleaner 100 and a designated direction of following the second virtual trajectory C2.

Meanwhile, in one implementation, when a direction of following the path of the first virtual trajectory C1 or the second virtual trajectory C2 is not designated, the direction of following the virtual trajectory may vary depending on signal strength or signal direction of a first optical signal detected by the robot cleaner 100.

Hereinafter, an example of a method of setting a plurality of target points for pointing cleaning will be described in detail in relation to the first implementation, with reference to FIG. 12.

Regarding the foregoing first implementation, the user may set a plurality of target points at once from a remote distance by sequentially pointing to the robot cleaner 100 using the remote control device 200 (①) to a first target point (②), and to a second target point continuously or within a predetermined time (③).

Meanwhile, the method of calculating the position P1 of the first target point based on the position P1 of the robot cleaner 100 has been described in detail in the first implementation.

A method of calculating a position P2 of the second target point based on the position P1 of the robot cleaner 100 is similar to this. Specifically, a distance D2 to a third optical signal pointing to the second target point based on the posture value of the remote control device 200 at the time when the trigger signal is emitted to the robot cleaner 100 may be acquired in a similar manner to calculating the distance D1 to the second optical signal pointing to the first target point.

Figure 12:
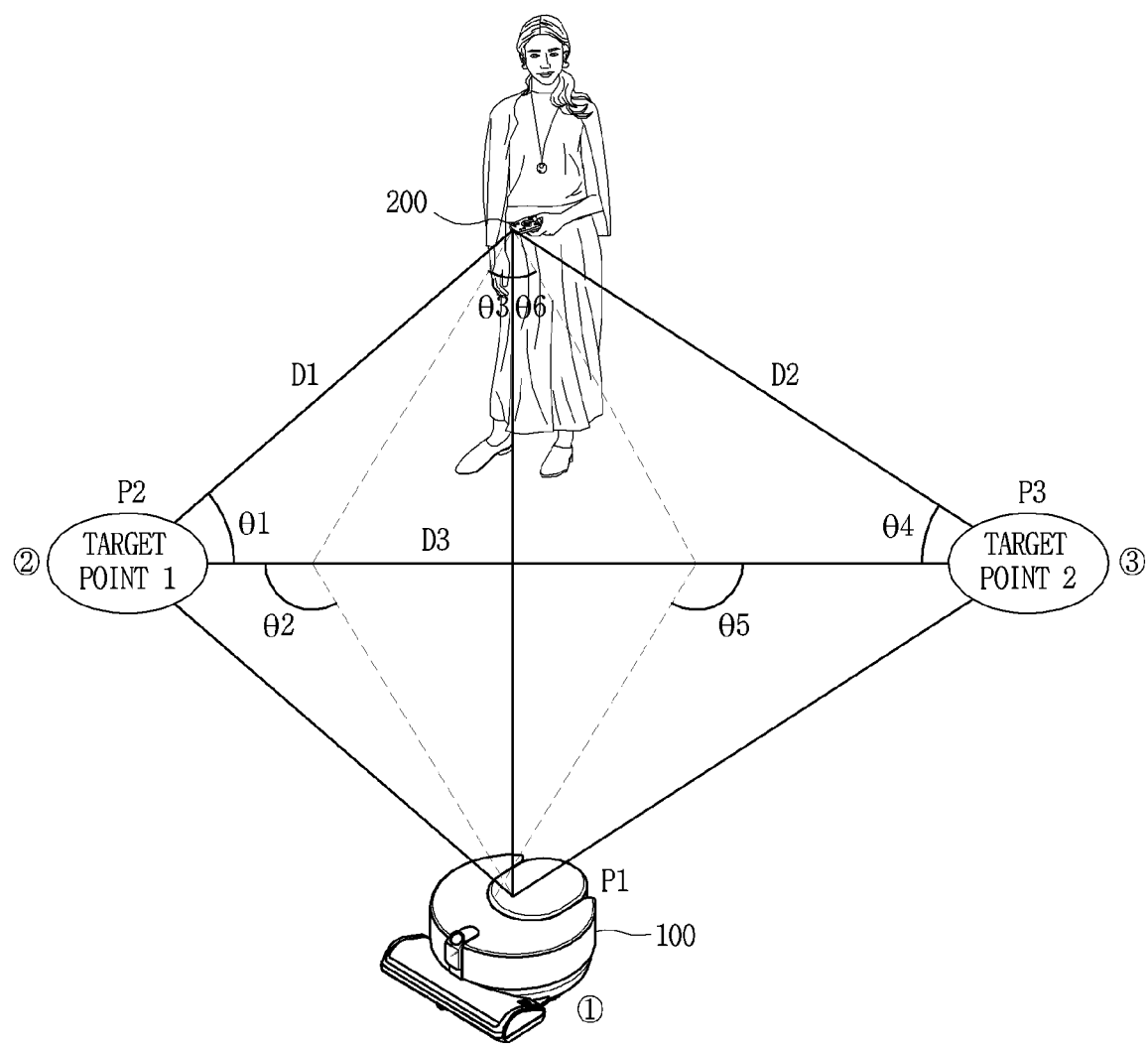
FIG. 12 is an exemplary conceptual view illustrating a method of traveling by setting a plurality of target points in the second implementation, in the robot cleaner according to the implementation of the present disclosure.

Also, coordinate information regarding the second target point based on the robot cleaner 100 may be calculated by multiplying a coordinate transformation matrix, which includes angles θ4, θ5, θ6 shown in FIG. 12 and the coordinate information (x3, y3, z3) of the remote control device 200 obtained using the robot cleaner 100 as a zero point, by the distance information D2 from the remote control device 200 to the second target point.

Meanwhile, the calculated coordinate information related to the second target point may be calculated based on the current position P1 of the robot cleaner 100. Therefore, in order to move directly to the second target point without returning to the previous position P1 after cleaning the first target point, coordinate information corresponding to a position P3 of the second target point based on the position P2 of the first target point may be needed.

To this end, a distance D3 from the position P2 of the first target point to the second target point may be acquired based on the two distance information D1 and D2 using the Pythagorean theorem, and angular information to be turn toward the position P3 of the second target point from the first target point may be acquired based on the previously calculated angles θ1, θ2, and θ3 and angles θ4, θ5, and θ6. Accordingly, the robot cleaner 100 may perform pointing cleaning after moving from the current position P1 to the position P2 of the first target point P2, and then move directly to the position P3 of the second target point, without moving back to the previous position, so as to perform an additional task for the second target point.

As described above, in the robot cleaner and the control method thereof according to the implementations of the present disclosure, even when the user manipulating the remote control device is far apart from the robot cleaner or an obstacle exists between the user and the robot cleaner, pointing cleaning for an area/point far from the robot cleaner can be performed. In addition, even if the remote control device does not point to the robot cleaner at the beginning, the robot cleaner can arrive at the area/point pointed by the remote control device by following a path of a virtual trajectory centered on the position of the remote control device. Furthermore, a plurality of areas/points at remote distances can be pointed at once by the remote control device, Even in this case, pointing cleaning can be sequentially performed for the plurality of designated areas/points without having to go through an initial position or a designated position.

The present disclosure described above can be implemented as computer-readable codes on a program-recorded medium. The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may also include the control unit 1800. The above detailed description should not be limitedly construed in all aspects and should be considered as illustrative. The scope of the present disclosure should be determined by rational interpretation of the appended claims, and all changes within the scope of equivalents of the present disclosure are included in the scope of the present disclosure.

What is claimed is:

1. A robot cleaner, comprising:
a traveling unit to move a main body thereof;
a communication unit to perform communication with a remote control device using an ultra-wideband (UWB) signal; and
a control unit to calculate a position of the remote control device using the UWB signal output to the communication unit, in response to a first optical signal emitted from the remote control device to the main body,
wherein in response to a second optical signal and a third optical signal continuously emitted from the remote control device to different points directly after the first optical signal, the control unit recognizes a position of a target point corresponding to the second optical signal calculated based on the position of the remote control device, acquires a position of a second target point corresponding to the third optical signal additionally calculated based on the calculated position of the remote control device, and acquires a relative position of the second target point with respect to the position of the target point corresponding to the second optical signal, and
wherein the control unit generates a first travel command for moving the main body to the position of the target point corresponding to the second optical signal, and generates a second travel command for moving the main body to the relative position of the second target point when a task at the target point corresponding to the second optical signal is completed.

2. The robot cleaner of claim 1, wherein the communication unit comprises a UWB module to transmit or receive the UWB signal, and determines a relative position of the remote control device by transmitting a UWB signal to the remote control device through the UWB module in response to the first optical signal and receiving a corresponding UWB signal through another UWB module provided in the remote control device.

3. The robot cleaner of claim 2, wherein the control unit acquires first coordinate information corresponding to the relative position of the remote control device with respect to the main body based on the UWB signal received through the communication unit,
transmits the acquired first coordinate information to the remote control device such that the remote control device calculates second coordinate information corresponding to the position of the target point based on the first coordinate information,
receives third coordinate information calculated based on the second coordinate information and the main body, from the remote control device, and
controls the main body to move to a position corresponding to the third coordinate information.

4. The robot cleaner of claim 2, wherein the control unit acquires first coordinate information corresponding to the relative position of the remote control device with respect to the main body based on the UWB signal received through the communication unit,
receives second coordinate information corresponding to a relative position of the target point, to the remote control device, the relative position of the target point being calculated with respect to the remote control device, and
estimates a relative position of the target point with respect to the main body based on the first coordinate information and the second coordinate information.

5. A robot cleaner, comprising:
a traveling unit to move a main body thereof;
a communication unit to perform communication with a remote control device using an ultra-wideband (UWB) signal; and
a control unit to calculate a position of the remote control device using the UWB signal output from the communication unit,
wherein the control unit generates a virtual trajectory centered on the position of the remote control device when an optical signal pointing to a target point is emitted from the remote control device, and
generates a second travel command for following a path of the virtual trajectory until arriving at the target point, at which the optical signal is received from the remote control device, when the main body enters the virtual trajectory according to a first travel command.

6. The robot cleaner of claim 5, wherein the virtual trajectory has a radius corresponding to a distance from the calculated position of the remote control device to the target point corresponding to the optical signal, and
wherein the control unit determines a direction of entering the virtual trajectory so that the main body follows the path of the virtual trajectory in a predetermined direction.

7. The robot cleaner of claim 5, wherein the main body comprises a plurality of receivers to receive an optical signal emitted from the remote control device, and
wherein the control unit, when the main body arrives near a point where the optical signal is received within the virtual trajectory according to the second travel command, recognizes the position of the target point based on signal strength of the optical signal received by the plurality of receivers, and controls the traveling unit to move to the recognized position of the target point.

8. The robot cleaner of claim 5, wherein the control unit controls the traveling unit to follow the virtual trajectory along around an obstacle when the obstacle is detected in the virtual trajectory while traveling along the path of the virtual trajectory.

9. The robot cleaner of claim 5, wherein the control unit, when a second optical signal corresponding to a changed target point is generated from the remote control device while the main body travels along the path of the virtual trajectory,
generates a second virtual trajectory having a radius corresponding to a distance from the remote control device to the changed target point corresponding to the second optical signal, and
controls the traveling unit so that the main body enters the second virtual trajectory from a current position according to the second travel command.

* * * * *